Patented Nov. 21, 1950

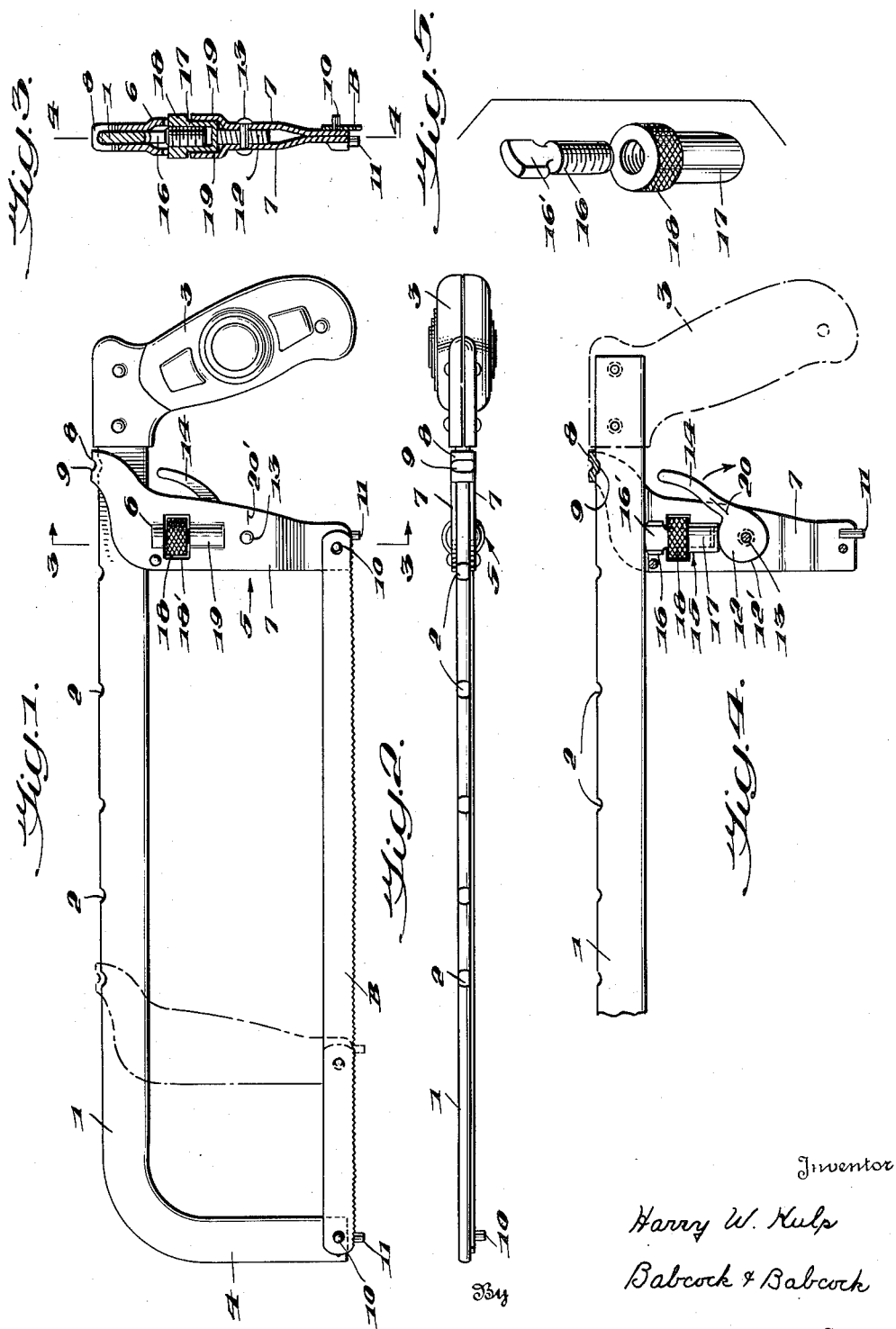

2,531,135

UNITED STATES PATENT OFFICE 2,531,135

ADJUSTABLE HACKSAW FRAME

Harry W. Kulp, Lancaster, Pa., assignor to K-D Manufacturing Company, a corporation of Pennsylvania Application September 24, 1946, Serial No. 698,888

9 Claims. (Cl. 145—34)

This invention relates to adjustable hack saw frames, and more particularly to the arrangement therein of blade changing and tension adjusting mechanism.

It is old in prior art constructions such as are typified in the disclosures of Patent 1,382,448 to Wilkins and Patent 2,320,511 to Curry to provide a saw frame having a pair of blade supporting arms one of which is movable towards or away from the other, to permit removal or replacement of the blade, together with actuating means associated with the movable or adjustable arm for urging it away from the other arm in order to retain the blade under tension.

Where the adjustable arm was mounted for swinging or rocking movement or adjustment, the actuating means for accomplishing such movement have heretofore consisted either of an inherently slowly operating mechanism, such as a screw, capable of attaining a fine adjustment of the blade tension but requiring complete resetting each time a blade is replaced or repositioned; or alternatively said actuating means have consisted of quick releasing mechanism such as a single throw lever and cam arrangement, which has been incapable of adjustment to obtain varying degrees of tension in the saw blade.

In other prior known frames of the type wherein the adjustable blade supporting arm is adjustable only by linear movement, it has heretofore been proposed to utilize actuating means which embody features enabling both a quick blade change and a fine tension adjustment. However in order to accomplish the linear movement or adjustment of the adjustable blade supporting arm, the actuating means in such frames has comprised considerable relatively complicated and bulky mechanism, including linkages interposed between various of the parts, for translating the movements and forces thereof into the required linear components.

The present invention has been developed with the foregoing in mind and accordingly has for its primary objects: to provide a simplified adjustable hack saw frame wherein the adjustable blade supporting arm is swingable relative to the frame back or bar, and the actuating means for moving said arm are disposed to transmit linear force directly between said arm and bar to effect a swinging or rocking adjustment of said arm without the necessity of any interposed linkages or other motion or force translating means; to provide such a hack saw frame in which the said actuating means incorporates a blade tension adjusting mechanism to accurately attain the desired degree of blade tension, in association with a quick blade change mechanism which may be operated to permit replacement or repositioning of the saw blade without disturbing the setting of the blade tension adjusting mechanism; to provide such actuating means which, due to its simplicity and compactness, may be mounted on or housed in the adjustable blade supporting arm of the frame without substantially increasing the overall bulk thereof and obstructing the operation of the saw in narrow or constricted spaces, thus making possible the attaining of all of the advantageous features of the aforementioned Wilkins patent, whereby same is operable to work around obstructions or through narrow slots or openings; to provide in connection with the actuating means or mechanism a novel arrangement of indicia for setting said mechanism to a predetermined position wherein the blade tension is partially released, facilitating the adjustment of the blade tension adjustment mechanism to a predetermined setting which will insure substantially proper blade tension adjustment when the actuating means is reset to reapply full blade tension; and to provide a novel, simplified and compact construction which is adapted for economical production by usual metal working operations and methods.

The above as well as other objects and advantages apparent hereinafter are attained by the preferred embodiment of the invention illustrated in the accompanying drawings in which:

Figure 1 represents a side elevation of the preferred embodiment of the invention, the adjustable arm being shown in broken lines in a position of longitudinal adjustment adapting the frame for use with saw blades of short length;

Figure 2, a top plan view of the device shown in Figure 1;

Figure 3, a section on the line 3—3 of Figure 1, looking in the direction of the arrows;

Figure 4, a fragmentary sectional view along the line 4——4 of Figure 3, showing the arrangement of the actuating means in the adjustable blade supporting arm; and, Figure 5, an enlarged "exploded" view of the two cooperating threaded elements of the thrust transmitting mechanism.

Referring now in detail to the accompanying drawings, the numeral 1 thereof designates a rigid longitudinal frame back or bar which preferably is provided with a series of relatively longitudinally spaced notches or depressions 2 in its upper edge, for purposes hereinafter appearing. A handle 3, which may conveniently be of the pistol grip type, is rigidly secured at the rear end of the frame bar 1, and a stationary or fixed blade supporting arm 4 depends from the forward end thereof. It is desirable to form the frame bar 1 and fixed blade supporting arm 4 as an integral rigid metal construction, in accordance with known practices.

A depending adjustable blade supporting arm 5 is mounted on the bar 1 for relative swinging movement or adjustment in a longitudinal plane passing through the fixed arm 4 and bar 1. Although any of various types of pivotal connections between the arm 5 and bar 1 may be utilized to effect such a mounting, it is preferred to associate the arm 5 and bar 1 in such a manner as to provide for linear adjustment of the arm 5 and its pivotal connection to various longitudinal positions on the bar 1. The purpose of this is to permit the saw frame to be used with blades B of various lengths, as illustrated by the different full line and broken line positions of the arm 5 in Figure 1 of the drawings.

To this end the arm 5 of the preferred embodiment comprises a pair of transversely spaced plates 7, the upper portions of which extend rearwardly on opposite sides of the bar 1 and in snug sliding engagement therewith. Said portions are connected across the upper edge of the bar 1 by a preferably integral yoke or bridge 8 having a downwardly projecting bearing portion or detent 9 which may be seated in any of the various notches 2 of the bar 1 to provide a fulcrum or pivotal connection between the arm 5 and bar 1. The lower ends of the plates 7 preferably converge and are rigidly secured together to increase their strength and decrease the transverse dimensions of the arm 5 at its blade supporting free end.

The arms 4 and 5 are each provided with suitable blade attaching means which may consist of the usual arrangement of transverse pins 10—10 respectively secured to the free end portions of said arms to be received in the usual attaching holes near the ends of the saw blade B, which is thereby supported in a vertical plane. An additional set of vertical depending pins 11—11 may be secured to the ends of said arms 4 and 5 respectively to permit the mounting of the blade B for cutting in a plane transverse to the saw frame. Said blade attaching means are well known and constitute no part of the present invention.

The actuating means for the arm 5 includes suitable means for imparting a fixed amount of linear thrust or movement from said arm to the bar 1 in a direction substantially transverse to the radius of swinging movement of said arm, and thrust transmitting mechanism for conveying said thrust from said means to the bar 1, said mechanism preferably being extensible in the direction of said thrust to vary the range thereof.

In the preferred embodiment, the aforesaid means for imparting linear movement is embodied in a cam or eccentric 12 which is carried by the arm 5 for rotary movement beneath the bar 1. Preferably same is mounted for rotation between the plates 7 on a pivot pin 13, the ends of which are received and supported in transversely opposed holes in said plates 7. This preferred embodiment of means has a peripherally presented cam face 12' which is presented at varying levels towards the bar 1 as the cam is rotated, thereby producing a linear component of force and motion which may be transmitted to the bar 1 as aforementioned.

Suitable means such as the integral lever 14 projecting rearwardly from between the plates 7 is provided to permit manual rotation or rotary movement of the cam 12.

The relative arrangement of the cam 12 and lever 14 is preferably such that, when the lever 14 is swung upwardly to the operative position shown in Figures 1 and 4, the portion of the cam surface 12' having the greatest radius is rotated slightly past the thrust transmitting means 15 referred to hereinafter so that said means or mechanism 15 engages the cam at a location where its radius is very slightly decreased relative to its adjacent maximum radius, which must be rotated past said mechanism 15 to release the blade tension. Such arrangement serves to lock or retain the actuating means in operative position against the force of the blade tension. The smallest radius of the cam 12 is presented or rotated into engagement with the mechanism 15 when the lever 14 is swung downwardly as indicated by the arrow in Figure 4.

The actuating mechanism also includes the rigid thrust transmitting mechanism or cam follower hereinbefore referred to, which is designated 15 in its entirety. Same is disposed to transmit linear thrust from the cam 12 to the bar 1 to cause swinging movement of the arm 5. To accomplish this, the mechanism 15 is slidably associated with the arm 5 with one of its linear extremities in operative engagement with the cam surface 12' and its other linear extremity abutting against the bar 1 at a location longitudinally forwardly spaced from the bearing portion 9 of the arm 5, so that the linear force will be exerted in a substantially tangential direction relative to the swinging movement of the arm 5.

While the present inventive concept is sufficiently novel to include various types of thrust transmitting mechanisms in the actuating mechanism thereof, whether or not same are extensible, the provision of an extensible mechanism 15 and its combination with the other elements of the invention constitutes a highly novel and advantageous feature of the invention.

This will be apparent from the fact that the conformation of the cam surface 12' is fixed, hence the cam 12 can transmit only a fixed range of movement to the mechanism 15, thus is incapable of adjustment to vary the resulting tension on the saw blade B, or to obtain a uniform degree of tension in different blades B of slightly varying lengths or slightly varying distances between their mounting or attaching holes.

Such adjustment however can be obtained through adjusting the length of the extensible member or mechanism 15 of the present invention, hence said mechanism constitutes the blade tension adjusting mechanism of the invention.

Such extensible mechanism 15 comprises cooperating threaded elements 16 and 17 in threaded engagement with each other and axially or linearly slidable as a unit in the arm 5. One of said elements 16 is maintained against rotation, while the other of said elements 17 is rotatably journalled in the handle 5 and provided with means 18 such as a knurled flange accessible from the exterior of the arm 5 to permit manual engagement and rotation thereof, with consequent variation in the over all linear or axial dimension of said mechanism 15.

In the embodiment illustrated, the rotatable element 17 is utilized as the lower element. Same is formed as a cylindrical internally screw threaded socket element and mounted both for rotation and for linear axial sliding movement in the arm 5 with its lower end or axial extremity in operative engagement with the cam surface 12'. The opposed side plates 7 of the arm 5 are formed with transversely opposed cylindrically outwardly curved journal bearing portions 19 between which said element 17 is journalled and axially movable.

The flange 18 of member or element 17 is accessible from the exterior of arm 5 through openings or apertures 18' in plates 7, and preferably projects radially through said openings to be easily accessible for manual engagement and rotation. It will be noted that the openings 18' are of sufficient axial or vertical extent so as not to interfere with the linear or axial movement of the element 17 within its operative range.

The non-rotatable element 16 of the preferred embodiment has a threaded male lower portion operatively disposed in the threaded socket of the element 17. The upper linear extremity of the element 16 projects between the plates 7 into abutting engagement with the frame bar or back 1. In order to prevent rotation of element 16 said upper linear extremity or portion is formed of non-circular cross section having flat surfaces 16' disposed between and in sliding engagement with said plates 7, as shown in Figure 3.

The outward projections 6 of the plates 7 in the preferred embodiment are merely for the purpose of providing clearance for the threaded cylindrical male portion of element 16 during its linear movement.

In order to increase the ease and accuracy of the blade tension adjustment when replacing or repositioning blades in the saw frame, it is desirable to provide the lever 14 and one of the plates 7 respectively with cooperating indicia 20 and 20'. Said indicia 20 and 20' are arranged to come into alignment as the lever 14 is swung towards locking position to such a point that extension of the member or mechanism 15 by rotation of the flange 18 until substantial opposition is encountered exerts a given amount of tension, less than the desired operating tension, on the saw blade B. Subsequent upward swinging movement of the lever 14 to operative locked position will then add such additional tension as will result in attaining the desired degree of operating tension in the blade B.

Thus it will be seen that an arrangement is provided whereby accurate adjustment and adequate tensioning of the blade B may be attained by the exertion of a minimum amount of effort exerted on the threaded tension adjusting mechanism or thrust transmitting mechanism 15. The mechanical advantage provided by the lever 14 in combination with the cam 12 permits said lever to be easily and quickly operated in the manner above described.

In the operation of the invention, which is believed to be readily apparent from the foregoing, to change or reposition a saw blade, the lever 14 is swung downwardly, as indicated by the arrow in Figure 4, rotating the cam 12 in such a way as to release the tension on the blade B, which may then be removed from the pins 10—10.

The same or a new blade B may then be positioned on either the pins 10—10 or 11—11 in usual manner, whereupon the lever 14 will be swung upwardly to a position wherein its indicia mark 20 registers or is in alignment with the indicia mark 20' of the arm 5. With the lever 14 held in this position, the knurled flange 18 may be turned until tight to extend the mechanism 15 into abutment with the cam 12 and bar 1. Then the lever 14 may be swung upwardly to locked position to obtain the desired operating tension in the blade B.

Alternatively, the indicia 20 and 20' may be omitted or ignored, and the lever 14 swung completely upwardly to locking position before the knurled flange is operated to adjust the blade tension. In such case however it will be more difficult to rotate the flange due to the additional thrust exerted on the mechanism 15, and it will probably be more difficult for an inexperienced user to attain the correct degree of blade tension.

In either case, it will be seen that the thrust transmitting mechanism 15 functions as a blade tension adjusting mechanism to obtain the desired degree of blade tension, while the cam 12 and lever 14 function as a quick blade change mechanism which may be actuated to permit replacement or repositioning of blades without necessarily disturbing the setting of the blade tension adjusting mechanism.

In this application I have shown and described only the preferred embodiment of my invention, simply by way of illustration of the practice thereof as by law required. However I recognize that the invention is capable of other and different embodiments and that the details thereof may be altered in various ways, all without departing from my said invention. Therefore the drawings and description herein are to be considered as merely illustrative and not as exclusive.

I claim:

1. An adjustable hack saw frame comprising a rigid longitudinal frame bar formed with a series of longitudinally spaced notches in its upper edge, a fixed blade supporting arm depending from the forward end thereof, a handle rigidly secured to the rear thereof, and a depending adjustable blade supporting arm mounted on said bar for longitudinal adjustment and for relative swinging movement in the longitudinal plane of said fixed arm, said adjustable arm comprising a pair of transversely spaced depending plates having their upper portions slidably disposed on opposite sides of said bar, and a longitudinally rearwardly disposed yoke connecting said plates across the upper edge of said bar and having a bearing portion seated in one of the notches therein to provide a pivot for the swinging movement of said arm, said plates being formed below said bar with transversely opposed partially cylindrical journal bearing portions and opposed apertures in axial alignment therewith, in combination with a cam mounted between said plates below said journal bearing portions for rotary movement about a transverse axis, and having a peripheral cam surface, an operating lever integral with said cam projecting rearwardly from between said plates, and rigid linearly extensible thrust transmitting mechanism comprising a lower threaded element mounted for both rotary and axial sliding movement in the journal bearing portions of said plates with its lower linear extremity in operative engagement with said cam, said lower element being formed with a knurled flange projecting through said apertures to permit manual engagement and rotation of said element, and an upper non-rotatable threaded element in threaded engagement with said lower element and linearly movable therewith, said upper element being formed with a non-cylindrical portion disposed between and in linear sliding engagement with said plates to maintain same against rotation, the upper linear extremity of said element abutting against said frame bar at a location longitudinally forwardly spaced from the pivotal axis of said adjustable arm.

2. An adjustable hack saw frame comprising a rigid longitudinal frame bar formed with a series of relatively longitudinally spaced notches in its upper edge, a fixed blade supporting arm depending from the forward end thereof, and a depending adjustable blade supporting arm mounted on said bar for longitudinal adjustment and for relative swinging movement in the longitudinal plane of said fixed arm, said adjustable arm comprising a pair of relatively transversely spaced depending plates having their upper portions slidably disposed on opposite sides of said bar, and a longitudinally rearwardly disposed yoke connecting said plates across the upper edge of said bar and having a bearing portion seated in one of the notches therein to provide a pivot for the swinging movement of said arm, said plates being formed below said bar with transversely opposed journal bearing portions and opposed apertures in axial alignment therewith, in combination with a cam mounted between said plates below said journal bearing portions for rotary movement, an operating lever fixedly secured to said cam and projecting rearwardly from between said plates, and rigid linearly extensible thrust transmitting mechanism linearly slidably associated with said arm to transmit a linear thrust from said cam to a location on said bar longitudinally forwardly spaced from said pivot, said mechanism comprising relatively rotatable threaded elements, one of said elements being cylindrical and mounted for both rotary and axial sliding movement in the journal bearing portions of said plates, and having a knurled flange accessible through the apertures of said plates to permit manual engagement and rotation of said element, the other of said elements having a non-cylindrical portion disposed between and in linear sliding engagement with said plates to prevent rotation thereof.

3. An adjustable hack saw frame comprising a rigid longitudinal frame bar, a fixed blade supporting arm depending from the forward end thereof, and a depending adjustable blade supporting arm mounted on said bar for longitudinal adjustment and for relative swinging movement in the longitudinal plane of said fixed arm, said adjustable arm comprising a pair of relatively transversely spaced depending plates respectively formed below said bar with transversely opposed journal bearing portions and opposed apertures in axial alignment therewith, in combination with a cam mounted between said plates for rotary movement, means for causing such rotary movement, and rigid linearly extensible thrust transmitting mechanism linearly slidably associated with said arm to transmit a linear thrust from said cam to a location on said bar longitudinally forwardly spaced from the axis of swinging movement of said adjustable arm, said mechanism comprising cooperating screw threaded elements, one of said elements having a cylindrical portion mounted for both rotary and axial sliding movement in the journal bearing portions of said plates, said element being accessible for manual engagement and rotation through said apertures.

4. An adjustable hack saw frame comprising a rigid longitudinal frame bar, and a depending adjustable blade supporting arm mounted on said bar for relative swinging movement in a longitudinal plane, said arm comprising a pair of relatively transversely spaced depending plates respectively formed below said bar with transversely opposed journal bearing portions, in combination with a cam mounted for rotary movement between said plates, means for causing such rotary movement, and rigid linearly extensible thrust transmitting mechanism linearly slidably associated with said arm to transmit a linear thrust from said cam to a location on said bar longitudinally spaced from the axis of swinging movement of said arm, said mechanism comprising cooperating screw threaded elements, one of said elements being mounted for both rotary and axial sliding movement in said journal bearing portions.

5. In an adjustable hack saw frame comprising a longitudinal frame bar and an adjustable blade supporting arm pivotally connected thereto for swinging adjustment in a longitudinal plane, the combination with said arm of actuating means for causing such swinging adjustment comprising a cam rotatably carried by said arm, means for causing rotary movement of said cam, and thrust transmitting mechanism carried by said arm for linear sliding movement to transmit linear thrust from said cam to a location on said bar longitudinally spaced from the pivotal connection between said bar and said arm, said thrust transmitting mechanism being linearly extensibly adjustable to vary the range of the swinging movement produced in said arm responsive to rotary movement of said cam and comprising cooperating screw threaded elements in threaded engagement with each other, said elements being relatively rotatable about a linear axis.

6. An adjustable hack saw frame comprising, a rigid longitudinal frame bar, a depending adjustable blade supporting arm mounted on said bar for adjustment to any of a plurality of predetermined longitudinal positions thereon, and means pivotally connecting said arm to said bar for relative swinging movement in each of the said longitudinal positions, said adjustable arm comprising a pair of relatively transversely spaced plates, said plates being formed below said bar with transversely opposed journal bearing portions, in combination with a cam mounted for rotary movement between said plates, means for causing such rotary movement, and rigid linearly extensible thrust transmitting mechanism linearly slidably carried by said arm and extending between said cam and a point on said bar longitudinally spaced from the pivotal connection between the arm and the bar whereby said cam can cause relative swinging movement of said bar and arm in any of the longitudinal positions of said arm, said mechanism comprising cooperating elements in threaded engagement with each other, one of said elements being mounted for rotary movement and axial sliding movement in said journal bearing portions.

7. An adjustable hack saw frame comprising, a rigid longitudinal frame bar, a depending blade supporting arm, and means for connecting said arm to said frame bar for relative swinging movement about any of a plurality of axes at different longitudinal locations on said bar, in combination with a cam carried by said arm for rotary movement, means for causing such movement, and rigid linearly extensible thrust transmitting mechanism carried by said arm for sliding movement between said cam and a point on said bar longitudinally spaced from the pivotal connection between said arm and bar in any of the positions of longitudinal adjustment of said arm, said mechanism comprising an internally threaded socket element rotatably journalled in said arm, and a male element in threaded engagement with said socket element, said male element being non-rotatably associated with said arm whereby rotary movement of said socket element will cause linear adjustment of said mechanism.

8. An adjustable hack saw frame comprising, a rigid longitudinal frame bar, a depending adjustable blade supporting arm mounted on said bar for adjustment to any of a plurality of predetermined longitudinal positions thereon, and means pivotally connecting said arm to said bar for relative swinging movement in each of the said longitudinal positions, said adjustable arm comprising a pair of relatively transversely spaced plates, said plates being formed below said bar with transversely opposed journal bearing portions, in combination with a cam mounted for rotary movement between said plates, means for causing such rotary movement, and rigid linearly extensible thrust transmitting mechanism linearly slidably disposed in said bearing portions and extending between said cam and a point on said bar longitudinally spaced from the pivotal connection between the arm and the bar whereby said cam can cause relative swing movement of said bar and arm in any of the longitudinal positions of said arm.

9. An adjustable hack saw frame comprising, a rigid longitudinal frame bar, a depending blade supporting arm mounted on said bar for adjustment to various longitudinal positions thereon, and means pivotally connecting said arm to said bar for relative swinging movement in each of said positions, in combination with a cam carried by said arm for rotary movement, means for causing such movement, and rigid linearly extensible thrust transmitting mechanism carried by said arm for sliding movement between said cam and a point on said bar longitudinally spaced from the pivotal connection between the arm and the bar whereby said cam can cause relative swinging movement of said bar and arm in any of the positions of longitudinal adjustment of said arm.

HARRY W. KULP.

REFERENCES CITED

The following references are of record in the file of this patent:

UNITED STATES PATENTS

| Number | Name | Date |
| --- | --- | --- |
| 1,078,599 | Garman | Nov. 11, 1913 |
| 1,146,604 | Whitcomb | July 13, 1915 |
| 1,382,448 | Wilkins | June 21, 1921 |
| 1,424,378 | Remington | Aug. 1, 1922 |
| 1,535,931 | Macrini | Apr. 28, 1925 |
| 1,657,748 | Hanning | Jan. 31, 1928 |
| 2,320,511 | Curry | June 1, 1943 |